US011936038B2

(12) United States Patent
Pfeiffer et al.

(10) Patent No.: US 11,936,038 B2
(45) Date of Patent: Mar. 19, 2024

(54) SILICON PARTICLES HAVING A SPECIFIC CHLORINE CONTENT, AS ACTIVE ANODE MATERIAL FOR LITHIUM ION BATTERIES

(71) Applicant: Wacker Chemie AG, Munich (DE)

(72) Inventors: Jürgen Pfeiffer, Mehring (DE); Eckhard Hanelt, Geltendorf (DE); Harald Hertlein, Burghausen (DE); Karl Hesse, Burghausen (DE); Robert Maurer, Munich (DE)

(73) Assignee: Wacker Chemie AG, Munich (DE)

( * ) Notice: Subject to any disclaimer, the term of this patent is extended or adjusted under 35 U.S.C. 154(b) by 560 days.

(21) Appl. No.: 17/281,969

(22) PCT Filed: Oct. 2, 2018

(86) PCT No.: PCT/EP2018/076809
§ 371 (c)(1),
(2) Date: Mar. 31, 2021

(87) PCT Pub. No.: WO2020/069728
PCT Pub. Date: Apr. 9, 2020

(65) Prior Publication Data
US 2021/0376315 A1 Dec. 2, 2021

(51) Int. Cl.
*H01M 4/38* (2006.01)
*B01J 8/24* (2006.01)
*C01B 33/03* (2006.01)
*H01M 10/0525* (2010.01)
*H01M 4/02* (2006.01)

(52) U.S. Cl.
CPC ............... *H01M 4/386* (2013.01); *B01J 8/24* (2013.01); *C01B 33/03* (2013.01); *H01M 10/0525* (2013.01); *C01P 2004/51* (2013.01); *C01P 2004/61* (2013.01); *C01P 2004/62* (2013.01); *C01P 2004/64* (2013.01); *C01P 2006/12* (2013.01); *C01P 2006/80* (2013.01); *H01M 2004/021* (2013.01); *H01M 2004/027* (2013.01)

(58) Field of Classification Search
CPC ...... H01M 4/386; H01M 4/362; H01M 4/364; H01M 10/0525; H01M 10/052; H01M 2004/021; H01M 2004/027; B01J 8/24; C01B 33/03; C01P 2004/51; C01P 2004/61; C01P 2004/62; C01P 2004/64; C01P 2004/021; C01P 2004/027; C01P 2006/12; C01P 2006/80
See application file for complete search history.

(56) References Cited

U.S. PATENT DOCUMENTS

| 5,077,028 | A | 12/1991 | Age |
| 5,236,684 | A * | 8/1993 | Krause ................. C01B 21/068 501/97.1 |
| 7,141,334 | B2 | 11/2006 | Fukui et al. |
| 9,099,717 | B2 | 8/2015 | Nakanishi |
| 11,335,904 | B2 * | 5/2022 | Troegel ................. H01M 4/366 |
| 2008/0131694 | A1 * | 6/2008 | Sato ..................... C01B 33/021 423/325 |
| 2010/0266902 | A1 | 10/2010 | Takano et al. |
| 2015/0368113 | A1 | 12/2015 | Cho et al. |
| 2016/0156031 | A1 | 6/2016 | Kim et al. |

FOREIGN PATENT DOCUMENTS

| DE | 3781223 T2 | 12/1992 |
| DE | 102007047210 A1 | 4/2009 |
| DE | 102012207505 A1 | 11/2013 |
| EP | 1730800 B1 | 5/2008 |
| JP | 2012221758 A | 11/2012 |
| WO | 14202529 A1 | 12/2014 |
| WO | 15117838 A1 | 8/2015 |
| WO | 17025346 A1 | 2/2017 |
| WO | 17058024 A1 | 4/2017 |
| WO | 18082789 A1 | 5/2018 |
| WO | 18082794 A1 | 5/2018 |

* cited by examiner

Primary Examiner — Raymond Alejandro

(57) ABSTRACT

An anode active material for lithium ion batteries includes one or more unaggregated silicon particles having a mass-based chlorine content of from 5 to 200 ppm and a volume-weighted particle size distribution having diameter percentiles $d_{50}$ of from 0.5 μm to 10.0 μm.

14 Claims, No Drawings

SILICON PARTICLES HAVING A SPECIFIC CHLORINE CONTENT, AS ACTIVE ANODE MATERIAL FOR LITHIUM ION BATTERIES

CROSS-REFERENCE TO RELATED APPLICATION

This application is a U.S. National Phase Application of PCT/EP2018/076809, filed Oct. 2, 2018, the contents of which are hereby incorporated by reference in their entirety.

BACKGROUND

The invention relates to anode active materials containing silicon particles for lithium ion batteries, anodes containing anode active materials and also corresponding lithium ion batteries.

Rechargeable lithium ion batteries are at present the most practically useful electrochemical energy stores having the greatest gravimetric energy densities. Silicon has a particularly high theoretical material capacity (4200 mAh/g) and is therefore particularly suitable as active material for anodes of lithium ion batteries.

Anode active materials containing silicon disadvantageously experience extreme volume changes of up to about 300% during charging or discharging. This volume change results in high mechanical stressing of the anode active material and the total anode structure, which is also referred to as electrochemical milling and leads to a loss of electric contact and to destruction of the anode and accordingly results in a loss of capacity of the anode.

Furthermore, the surface of the silicon anode active material reacts with constituents of the electrolyte with continuous formation of passivating protective layers (solid electrolyte interface; SEI). The components formed are no longer electrochemically active. The lithium bound therein is no longer available to the system, which leads to a continuous loss of capacity of the battery. Owing to the extreme volume changes of silicon, the charging or discharging process of the battery frequently bursts open the SEI previously formed, as a result of which further surfaces of the silicon anode active material are exposed and are then subjected to further SEI formation. Since the amount of mobile lithium, which corresponds to the utilizable capacity, in the full cell is limited, this is consumed and the capacity of the cell decreases with the number of charging and discharging cycles of the battery. The decrease in capacity over the course of a number of charging and discharging cycles is also referred to as fading or continuous loss of capacity and is generally irreversible.

The use of silicon particles as anode active materials for lithium ion batteries is described, for example, in WO2017/025346, WO2014/202529 and U.S. Pat. No. 7,141,334. EP1730800 teaches aggregated, nanosize silicon particles whose primary particles have average particle diameters of from 5 to 200 nm for these purposes. The anode coatings usually contain further components such as binders, graphite or conductive additives in addition to silicon.

A number of industrial processes and process variants are known for the production of silicon as starting material for anode active materials. In the metallurgical production of silicon, silicon dioxide is reacted with carbon. In alternative processes, silanes are converted by means of pyrolysis into silicon, for example by the Siemens process, Komatsu-ASiMI process or fluidized-bed process. In the Siemens process, and also in the Komatsu-ASiMI process, silicon is deposited on silicon rods, while in the fluidized-bed process it is deposited on silicon particles. Monosilane ($SiH_4$) or chlorosilanes are frequently used as silanes.

U.S. Pat. No. 8,734,991 recommends polycrystalline silicon particles having a density of from 2.300 to 2.320 $g/cm^3$ and crystalline diameters of from 20 to 100 nm as anode active material for lithium ion batteries. A variety of processes for producing silicon particles are reported in U.S. Pat. No. 8,734,991. For the deposition of silicon on rods, i.e. by the Siemens or Komatsu-ASiMI process, different deposition temperatures are specified depending on the silane: in the case of monosilane ($SiH_4$) 850° C., in the case of trichlorosilane 1100° C. and in the case of dichlorosilane below 1000° C. Monosilane ($SiH_4$) and deposition temperatures of from 600 to 800° C. are disclosed for the fluidized-bed process. U.S. Pat. No. 8,734,991 generally advises against trichlorosilane since silicon particles having excessively large crystalline diameters were formed by the processes examined in U.S. Pat. No. 8,734,991. Pyrolysis of trichlorosilane by the Siemens process of U.S. Pat. No. 8,734,991 leads to silicon particles which also have too high a specific gravity for the purposes of U.S. Pat. No. 8,734,991. U.S. Pat. No. 8,734,991 indicates a deposition temperature of 1100° C. for the pyrolysis of trichlorosilane.

WO2017058024 recommends Si/C composite anodes for lithium ion batteries. The production of the silicon particles present in these composite anodes was carried out by the Siemens process using trichlorosilane at deposition temperatures of 1150° C. or in a fluidized-bed reactor using monosilane ($SiH_4$) or preferably by metallurgical production.

U.S. Pat. No. 9,099,717 discloses polycrystalline silicon particles having a density of from 2.250 to 2.330 $g/cm^3$, a BET surface area of from 0.1 to 5.0 $m^2/g$, a compressive strength of from 400 to 800 MPa and a crystalline diameter of from 20 to 100 nm as anode active material. The production of the silicon particles was carried out by vaporization of metallic silicon by means of electron beams and deposition of the resulting gaseous silicon under reduced pressure on a substrate having a temperature of from 300 to 800° C.

DE102012207505 and DE3781223 are concerned with the production of granular silicon for the photovoltaics or electronics industry, in particular the semiconductor industry. In these documents, the granular silicon is obtained by pyrolysis of trichlorosilane on silicon seed crystals in fluidized-bed reactors. Such granular silicon materials usually have particle sizes of from 150 μm to 10 000 μm. The Siemens process is described, for example, in DE102007047210. The silicon rods obtained in this way are broken up into fragments having dimensions of from 1 to 150 mm.

In the light of this background, it was an object of the invention to provide anode active materials which make a high cycling stability possible when used in lithium ion batteries, if possible with a small irreversible loss of capacity being obtained in the first cycle and a more stable electrochemical behavior with a very low loss of capacity being achieved in the following cycles.

The invention provides anode active materials for lithium ion batteries, characterized in that the anode active materials comprise one or more unaggregated silicon particles having a chlorine content of from 5 to 200 ppm and a volume-weighted particle size distribution having diameter percentiles $d_{50}$ of from 0.5 μm to 10.0 μm.

The unaggregated silicon particles according to the invention will hereinafter also be referred to as silicon particles for short.

The silicon particles have a chlorine content of preferably from 10 to 150 ppm, more preferably from 15 to 130 ppm, even more preferably from 16 to 110 ppm, particularly preferably from 17 to 100 ppm and most preferably from 20 to 90 ppm (method of determination: X-ray fluorescence analysis, preferably using the Bruker AXS S8 Tiger 1, instrument, in particular with rhodium anode).

Preference is given to ≥50% by weight, more preferably from ≥75% by weight, particularly preferably from ≥90% by weight and most preferably from ≥99% by weight, of the silicon particles, based on the total weight of the silicon particles, having a chlorine content according to the invention.

The silicon particles have volume-weighted particle size distributions having diameter percentiles $d_{50}$ of preferably from 1.0 to 8.0 µm, particularly preferably from 1.5 to 7.0 µm and most preferably from 2.0 to 6.0 µm.

The volume-weighted particle size distribution of the silicon particles has diameter percentiles $d_{10}$ of preferably from 0.2 µm to 10 µm, particularly preferably from 0.5 µm to 5.0 µm and most preferably from 0.8 µm to 3.0 µm.

The volume-weighted particle size distribution of the silicon particles has diameter percentiles $d_{90}$ of preferably from 2.0 µm to 20.0 µm, particularly preferably from 3.0 to 15.0 µm and most preferably from 5.0 µm to 10.0 µm.

The volume-weighted particle size distribution of the silicon particles has a breadth $d_{90}$-$d_{10}$ of preferably from ≤20.0 µm, particularly preferably from ≤14.0 µm and most preferably from ≤9.0 µm. The breadth $d_{90}$-$d_{10}$ is preferably ≥0.6 µm, particularly preferably from ≥0.8 µm and most preferably from ≥1.0 µm.

BRIEF SUMMARY

Embodiments of an anode active material for lithium ion batteries are described below. In an embodiment, the anode active material includes one or more unaggregated silicon particles having a mass-based chlorine content of from 5 to 200 ppm and a volume-weighted particle size distribution having diameter percentiles $d_{50}$ of from 0.5 µm to 10.0 µm.

BRIEF DESCRIPTION OF THE SEVERAL VIEWS OF THE DRAWING

The above, as well as other advantages of the present invention will become readily apparent to those skilled in the art from the following detailed description when considered in the light of the accompanying drawings in which:

FIG. 1/1 is an image illustrating individual, unaggregated, splinter-shaped silicon particles; and FIG. 2/2 is a scanning electron micrograph of an FIB section of an electrode coating.

DETAILED DESCRIPTION

The volume-weighted particle size distribution of the silicon particles can be determined by static laser light scattering, preferably using the Horiba LA 950 measuring instrument using alcohols, for example ethanol or isopropanol, or preferably water as dispersion medium for the silicon particles.

The silicon particles are preferably based on elemental silicon. For the purposes of the present invention, elemental silicon is preferably high-purity and/or polycrystalline silicon, optionally with a small proportion of foreign atoms (for example B, P, As).

The silicon particles preferably contain ≥95% by weight, more preferably from ≥98% by weight, particularly preferably from ≥99% by weight and most preferably from ≥99.9% by weight, of silicon. The figures in percent by weight are based on the total weight of the silicon particles, in particular on the total weight of the silicon particles minus the proportion of oxygen therein. The proportion according to the invention of silicon in the silicon particles can be determined by means of ICP (inductively coupled plasma) emission spectrometry in accordance with EN ISO 11885: 2009 using the Optima 7300 DV measuring instrument from Perkin Elmer.

The silicon particles generally contain silicon oxide. Silicon oxide is preferably present on the surface of the silicon particles. Silicon oxide can, for example, be formed in the production of the silicon particles by means of milling or on storage in air. Such oxide layers are also referred to as native oxide layers.

The silicon particles generally bear an oxide layer, in particular a silicon oxide layer, having a thickness of preferably from 0.5 to 30 nm, particularly preferably from 1 to 10 nm and most preferably from 1 to 5 nm (method of determination: for example HR-TEM (high-resolution transmission electron microscopy)) on their surface.

The silicon particles preferably contain from 0.1 to 5.0% by weight, more preferably from 0.1 to 2% by weight, particularly preferably from 0.1 to 1.5% by weight and most preferably from 0.2 to 0.8% by weight, of oxygen, based on the total weight of the silicon particles (determined using the Leco TCH-600 analyzer).

The silicon particles are unaggregated, preferably also unagglomerated and/or preferably also not nanostructured.

Aggregated means that spherical or largely spherical primary particles as are, for example, initially formed in gas-phase processes in the production of silicon particles have grown together to form aggregates, for example via covalent bonds. Primary particles or aggregates can form agglomerates. Agglomerates are a loose assembly of aggregates or primary particles. Agglomerates can easily be broken up again into the primary particles or aggregates by means of, for example, kneading or dispersing processes. Aggregates cannot be broken up, or virtually not be broken up, into the primary particles by these methods. Aggregates and agglomerates generally have quite different sphericities and particle shapes than the preferred silicon particles and are generally not spherical. The presence of silicon particles in the form of aggregates or agglomerates can, for example, be made visible by means of conventional scanning electron microscopy (SEM). In contrast, static light scattering methods for determining the particle size distributions or particle diameters of silicon particles cannot distinguish between aggregates or agglomerates.

The silicon particles preferably have sharp-edged fracture surfaces or are preferably splinter-shaped.

The silicon particles have a sphericity of preferably from 0.3≤ψ≤0.9, particularly preferably from 0.5≤ψ≤0.85 and most preferably from 0.65≤ψ≤0.85. Silicon particles having such sphericities can, in particular, be obtained by milling processes. The sphericity ψ is the ratio of the surface area of a sphere of the same volume to the actual surface area of a body (definition of Wadell). In the case of a sphere, ψ has the value 1. Sphericities can, for example, be determined from conventional SEM images.

The silicon particles preferably have a circularity c in the range from 0.4 to 0.9 and particularly preferably in the range from 0.5 to 0.8, based on the percentiles $c_{10}$ to $c_{90}$ of the circularity volume distributions. The circularity c is proportional to the ratio of the projected area A of a particle onto a plane divided by the square of the corresponding circumference U of this projection: $c=4\pi*A/U^2$. In the case of a circular projected area, c assumes the value 1. The measurement of the circularity c is carried out, for example, with the aid of micrographs of individual particles taken using an optical microscope or in the case of particles of <10 μm preferably using a scanning electron microscope by means of graphical evaluation by means of image analysis software, for example, ImageJ.

Silicon particles which are not nanostructured generally have characteristic BET surface areas. The BET surface areas of the silicon particles are preferably from 0.2 to 10.0 $m^2/g$, particularly preferably from 0.5 to 8.0 $m^2/g$ and most preferably from 1.0 to 5.0 $m^2/g$ (determination in accordance with DIN 66131 (using nitrogen)).

The silicon particles are preferably polycrystalline. The silicon particles are thus preferably not single crystals or amorphous. A polycrystal is generally a crystalline solid body which consists of many small individual crystals (crystallites) which are separated from one another by grain boundaries. An amorphous material is a solid in which the atoms do not have any ordered structures but instead form an irregular pattern and have only short-range order but not long-range order.

Polycrystalline silicon particles are characterized by crystallite sizes of preferably ≤200 nm, more preferably ≤150 nm, particularly preferably ≤100 nm and most preferably ≤80 nm. The crystallite size is preferably ≤5 nm, particularly preferably ≥10 nm and most preferably ≥15 nm. The crystallite size is determined by means of X-ray diffraction pattern analysis by the Scherrer method from the full width at half height of the Si (111) diffraction peak at 2Θ=28.4°. The NIST X-ray diffraction standard reference material SRM640C (single-crystal silicon) preferably serves as standard for the X-ray diffraction pattern of silicon.

The density of the silicon particles is preferably in the range from 2.250 to <2.330 $g/cm^3$, particularly preferably from 2.280 to 2.330 $g/cm^3$ and most preferably from 2.320 to 2.330 $g/cm^3$. This value is lower than that of single-crystal silicon. The density of the silicon particles can be determined by gas $ad_{50}$rption methods (pycnometer) using helium gas, preferably using the Pycnomatic ATC instrument from Porotec, in particular with a sample volume of 60 ml.

The silicon particles according to the invention are generally obtainable by means of
1) pyrolysis of a reaction gas comprising trichlorosilane and/or dichlorosilane in a fluidized-bed reactor at deposition temperatures of from 600° C. to 1000° C. to form granular silicon and subsequent
2) milling of the granular silicon from step 1) to form the silicon particles.

The invention further provides processes for producing anode active materials for lithium ion batteries, wherein
1) a reaction gas comprising trichlorosilane and/or dichlorosilane is pyrolyzed in a fluidized-bed reactor at deposition temperatures of from 600° C. to 1000° C. to form granular silicon and
2) the granular silicon obtained from step 1) is subsequently milled to form silicon particles.

Step 1) is preferably carried out in a fluidized-bed reactor, in particular a radiatively heated fluidized-bed reactor.

The reaction gas preferably comprises trichlorosilane and/or dichlorosilane and optionally monochlorosilane and optionally monosilane ($SiH_4$). Particular preference is given to trichlorosilane. The reaction gas particularly preferably does not contain any monosilane ($SiH_4$). Most preferred reaction gases comprise trichlorosilane and optionally dichlorosilane and optionally monochlorosilane. Reaction gases which comprise dichlorosilane and monochlorosilane are also most preferred.

Trichlorosilane and/or dichlorosilane and possibly monochlorosilane and possibly monosilane ($SiH_4$) are collectively also referred to as silicon-containing reaction gases.

The proportion of dichlorosilane and/or in particular trichlorosilane in the reaction gas is preferably from 50 to 100% by weight, particularly preferably from 90 to 100% by weight, more preferably from 95 to 100% by weight and most preferably from 99 to 100% by weight, based on the total weight of the silane.

The proportion of monochlorosilane in the reaction gas is preferably from 0 to 50% by weight, particularly preferably from 0.1 to 10% by weight, more preferably from 0.2 to 5% by weight and most preferably from 0.5 to 1% by weight, based on a total weight of the silanes.

Furthermore, the reaction gas can also contain reductive gases such as hydrogen.

Most preferably, the reaction gas consists of trichlorosilane and hydrogen.

The granular silicon is preferably produced by deposition of a reaction gas on seed crystals composed of silicon, in particular silicon particles, in a fluidized bed.

The seed crystals initially charged in the fluidized bed are preferably fluidized by means of a silicon-free fluidizing gas, in particular hydrogen, and preferably heated by means of thermal radiation. The heat energy is usually introduced uniformly over the circumference of the fluidized bed by means of areal heating radiators during heating. The reaction gas can, for example, be injected into the fluidized bed via one or more nozzles. In the reaction zone, the silicon-containing reaction gas is deposited as elemental silicon on the silicon particles by means of a CVD reaction. Unreacted reaction gas, fluidizing gas and gaseous secondary reaction products are removed from the reactor. The process can be operated continuously by regular withdrawal of particles provided with the deposited silicon from the fluidized bed and addition of seed crystals.

A fluidized bed is also referred to synonymously as flowing bed in the present technical field.

The pyrolysis and deposition of silicon is preferably carried out at a temperature of the fluidized bed in the reaction region of from 700° C. to 1000° C. and particularly preferably from 760° C. to 980° C. The concentration of the silicon-containing reaction gas is, based on the total amount of gas through the fluidized bed, preferably from 6 mol % to 50 mol %, particularly preferably from 10 mol % to 40 mol %. The concentration of the silicon=containing reaction gas in the reaction gas nozzle is, based on the total amount of gas through the reaction gas nozzles, preferably from 15 mol % to 65 mol %, particularly preferably from 25 mol % to 65 mol %, very particularly preferably from 35 mol % to 60 mol %.

When trichlorosilane is the main constituent of the reaction gas, i.e., for example, the proportion of trichlorosilane is ≥50% by weight, based on the total weight of the silanes, the following is preferred with regard to the temperature in the pyrolysis and the concentration of the silicon-containing reaction gas: in the case of pyrolysis of a reaction gas comprising trichlorosilane, the pyrolysis is preferably carried out at a temperature of the fluidized bed in the reaction region of from 700° C. to 1000° C. and particularly preferably from 760° C. to 980° C. The concentration of the silicon-containing reaction gas comprising trichlorosilane is, based on the total amount of gas through the fluidized bed, preferably from 10 mol % to 50 mol %, particularly preferably from 15 mol % to 40 mol %. The concentration of the silicon-containing reaction gas in the reaction gas nozzle is, based on the total amount of gas through the reaction gas nozzles, preferably from 20 mol % to 65 mol %, particularly preferably from 30 mol % to 65 mol %, very particularly preferably from 40 mol % to 60 mol %.

When dichlorosilane is the main constituent of the reaction gas, i.e., for example, the proportion of dichlorosilane is ≥50% by weight, based on the total weight of the silanes, the following is preferred with regard to the temperature in the pyrolysis and the concentration of the silicon-containing reaction gas: in the case of pyrolysis of a reaction gas comprising dichlorosilane, the pyrolysis is preferably carried out at a temperature of the fluidized bed in the reaction region of from 600° C. to 900° C. and particularly preferably from 660° C. to 880° C. The concentration of the silicon-containing reaction gas comprising dichlorosilane is, based on the total amount of gas through the fluidized bed, preferably from 6 mol % to 45 mol %, particularly preferably from 10 mol % to 39 mol %. The concentration of the silicon-containing reaction gas in the reaction gas nozzle is, based on the total amount of gas through the reaction gas nozzles, preferably from 15 mol % to 60 mol %, particularly preferably from 25 mol % to 60 mol % and very particularly preferably from 35 mol % to 55 mol %.

The pressure in the fluidized-bed reactor is preferably in the range from 1.1 to 20 bara, particularly preferably from 2 to 10 bara.

The height of the packed bed in the fluidized-bed reactor is preferably from 100 to 1000 mm, particularly preferably from 100 to 500 mm and most preferably in the range from 120 to 140 mm.

The process of step 1) is preferably operated continuously. Seed crystals composed of milled granular silicon are preferably fed continuously to the fluidized-bed reactor. Granular silicon is preferably taken off continuously from the fluidized-bed reactor. These measures also ensure that granulated silicon materials having a constant size are obtained.

Otherwise, the process for producing granular silicon by means of pyrolysis of silicon-containing reaction gas in the fluidized-bed reactor can be carried out in a conventional manner known per se, as described, for example, in DE102012207505.

The granular silicon obtained in step 1) has a particle size distribution in the range from 100 to 10000 μm. 98 percent by mass are preferably in the range from 600 to 4000 μm, with a mass-range median value (d50,3) in the range from 1050 to 2600 μm (method of determination: dynamic image analysis in accordance with ISO 13322-2, measurement range from 30 μm to 30 mm, dry measurement using powders or granules, preferably using the Camsizer measuring instrument from Retsch Technology).

The silicon particles obtained in step 1) have a sphericity of preferably $0.8 \leq \psi \leq 1.0$, particularly preferably $0.9 \leq \psi \leq 1.0$ and most preferably $0.91 \leq \psi \leq 1.0$. The sphericity $\psi$ is the ratio of the surface area of a sphere having the same volume to the actual surface area of a body (definition of Wadell). Sphericities can, for example, be determined from conventional SEM images.

The silicon particles obtained in step 1) have a circularity c of preferably $0.8 \leq c \leq 1.0$, particularly preferably $0.9 \leq c \leq 1.0$ and most preferably $0.91 \leq c \leq 1.0$. The circularity c is the ratio of the projected area A of a particle onto a plane divided by the square of the corresponding circumference U of this projection: $c = 4\pi * A/U^2$. Sphericities can, for example, be determined by image analysis from images of the particles, in particular by dynamic image analysis in accordance with ISO 13322-2, preferably using the Camsizer measuring instrument from Retsch Technology.

In step 2), the granular silicon from step 1) is milled to form the silicon particles according to the invention.

Milling can, for example, be carried out by wet milling processes or in particular by dry milling processes. Preference is given to using planetary ball mills, stirred ball mills or in particular jet mills, for example opposed jet mills or impact mills. Milling methods for these purposes are established per se. Thus, suitable dry milling processes are described, for example, in WO 2018/082789 or WO 2018/082794, and corresponding wet milling processes are known from WO 2017/025346.

Milling generally leads to unaggregated silicon particles. In contrast, the production of silicon particles having a particle size distribution according to the invention by exclusively gas-phase processes, e.g. vapor deposition, is known to usually lead to aggregated silicon particles.

The present invention further provides anodes, in particular for lithium ion batteries, containing anode active materials according to the invention.

The anodes preferably contain one or more binders, optionally graphite, optionally one or more further electrically conductive components and optionally one or more additives, characterized in that one or more anode active materials according to the invention are present.

Examples of further electrically conductive components are conductive carbon black, carbon nanotubes or metallic particles such as copper.

Preferred formulations for the anodes are based on preferably from 5 to 95% by weight, in particular from 60 to 85% by weight, of anode active materials according to the invention; from 0 to 40% by weight, in particular from 0 to 20% by weight, of further electrically conductive components; from 0 to 80% by weight, in particular from 5 to 30% by weight, of graphite; from 0 to 25% by weight, in particular from 5 to 15% by weight, of binders; and optionally from 0 to 80% by weight, in particular from 0.1 to 5% by weight, of additives; where the figures in percent by weight are based on the total weight of the formulations and the proportions of all constituents of the formulations add up to 100% by weight.

The invention further provides lithium ion batteries comprising a cathode, an anode, a separator and an electrolyte, characterized in that the anode contains anode active materials according to the invention.

In a preferred embodiment of the lithium ion batteries, the anode material of the fully charged lithium ion battery is only partially lithiated.

The present invention further provides methods for charging lithium ion batteries comprising a cathode, an anode, a separator and an electrolyte, characterized in that the anode contains anode active materials according to the invention and the anode material is only partially lithiated during complete charging of the lithium ion battery.

The invention further provides for the use of the anode materials according to the invention in lithium ion batteries which are configured in such a way that the anode materials are only partially lithiated in the fully charged state of the lithium ion batteries.

Apart from the anode active materials according to the invention, the starting materials customary for producing the electrode materials and lithium ion batteries can be used for producing these and the usual processes for producing the electrode materials and lithium ion batteries can be employed, as described, for example, in WO 2015/117838 or the patent application number DE 102015215415.7.

The lithium ion batteries are preferably constructed or configured and/or preferably operated so that the material of the anode (anode material), in particular the anode active material, is only partially lithiated in the fully charged battery. Fully charged refers to the state of the battery in which the anode material of the battery, in particular the anode active material, has its highest degree of lithiation. Partial lithiation of the anode material means that the maximum lithium uptake capacity of the anode active material in the anode material is not fully exploited.

The ratio of lithium atoms to silicon atoms in the anode of a lithium ion battery (Li/Si ratio) can, for example, be set via the flow of electric charge. The degree of lithiation of the anode material or of the silicon particles present in the anode material is proportional to the electric charge which has flowed through. In this variant, the capacity of the anode material for lithium is not fully exploited during charging of the lithium ion battery. This results in partial lithiation of the anode.

In an alternative, preferred variant, the Li/Si ratio of a lithium ion battery is set by the anode to cathode ratio (cell balancing). Here, the lithium ion batteries are designed so that the lithium uptake capacity of the anode is preferably greater than the lithium release capacity of the cathode. This leads to the lithium uptake capacity of the anode not being fully exploited, i.e. the anode material being only partially lithiated, in the fully charged battery.

In the lithium ion battery, the ratio of the lithium capacity of the anode to the lithium capacity of the cathode (anode to cathode ratio) is preferably ≥1.15, particularly preferably ≥1.2 and most preferably ≥1.3. The term lithium capacity here preferably refers to the utilizable lithium capacity. The utilizable lithium capacity is a measure of the capability of an electrode of storing lithium reversibly. The determination of the utilizable lithium capacity can, for example, be carried out by means of half-cell measurements of the electrodes relative to lithium. The utilizable lithium capacity is measured in mAh. The utilizable lithium capacity generally corresponds to the measured delithiation capacity at a charging and discharging rate of C/2 in the voltage window from 0.8 V to 5 mV. C in C/2 refers to the theoretical, specific capacity of the electrode coating.

The anode is preferably charged with ≤1500 mAh/g, particularly preferably ≤1400 mAh/g and most preferably ≤1300 mAh/g, based on the mass of the anode coating. The anode is preferably charged with at least 600 mAh/g, particularly preferably ≥700 mAh/g and most preferably ≥800 mAh/g, based on the mass of the anode coating. These figures are preferably based on the fully charged lithium ion battery.

In the case of partial lithiation, the Li/Si ratio in the anode material in the fully charged state of the lithium ion battery is preferably ≤3.5, particularly preferably ≤3.1 and most preferably ≤2.6. The Li/Si ratio in the anode material in the fully charged state of the lithium ion battery is preferably ≥0.22, particularly preferably ≥0.44 and most preferably ≥0.66.

The capacity of the silicon of the anode material of the lithium ion battery is preferably utilized to an extent of ≤80%, particularly preferably ≤70% and most preferably ≤60%, based on a capacity of 4200 mAh per gram of silicon.

The degree of lithiation of silicon or the utilization of the capacity of silicon for lithium (Si capacity utilization α) can, for example, be determined as described in the patent application number DE 102015215415.7 on page 11, line 4 to page 12, line 25, in particular with the aid of the formula indicated there for the Si capacity utilization α and the supplementary information under the headings "Determination of the delithiation capacity β" and "Determination of the proportion by weight of Si $\omega_{Si}$" ("incorporated by reference").

It has surprisingly been found that anode active materials according to the invention containing silicon particles lead to lithium ion batteries having particularly stable cycling behavior. These advantageous effects can be increased further by operating the lithium ion batteries with partial lithiation.

Here, the chlorine contents according to the invention have been found to be of particular importance. Silicon particles having higher or lower chlorine contents gave, as anode active materials, lithium ion batteries having a lower cycling stability. In addition, higher chlorine contents could lead in the first charging cycle of a lithium ion battery to an unacceptable immobilization of lithium and thus to an irreversible loss of lithium.

To obtain silicon particles having a chlorine content according to the invention, the fluidized-bed process in combination with the deposition temperatures and the use of silanes according to the invention have been found to be critical. On the other hand, the Siemens process was not suitable for producing silicon particles having chlorine content according to the invention. In the Komatsu-ASiMI process carried out using monosilane ($SiH_4$), too, chlorine contents according to the invention are ruled out. Fluidized-bed processes using exclusively monosilane ($SiH_4$) naturally also do not lead to the chlorine contents according to the invention.

The following examples serve to further illustrate the invention:

Determination of the Chlorine Content of Silicon Particles:

The determination of the chlorine content was carried out by means of X-ray fluorescence analysis on a Bruker AXS S8 Tiger_1 with rhodium anode. For this purpose, 5.00 g of the sample were mixed with 1.00 g of Boreox and 2 drops of ethanol and pressed under a pressure of 150 kN for 15 seconds in an HP 40 tableting press from Herzog to give pellets.

Determination of the Particle Sizes:

The measurement of the particle size distribution was carried out by static laser light scattering using the Mie model and a Horiba LA 950 in a highly diluted suspension in ethanol. The particle size distributions determined are volume-weighted.

Example 1 (Ex.1): Production of Silicon Particles

A fluidized-bed reactor was operated using a trichlorosilane mass flow of 710 kg/h, a hydrogen flow of 445 standard m³/h, a fluidized bed temperature of 960° C. and a reactor pressure of 2.5 bar.

The granular silicon obtained in this way was subsequently comminuted by milling a fluidized-bed jet mill (Netzsch-Condux CGS16, using 90 m³/h of nitrogen at 7 bar as milling gas). The silicon particles obtained in this way had the following particle size distribution: d10=2.4 μm, d50=4.5 μm and d90=7.2 μm.

Further properties of the silicon particles are summarized in table 1.

The scanning electron micrograph of the dry silicon particles in FIG. 1 shows that silicon was present in the form of individual, unaggregated, splinter-shaped particles.

Examples 2-4 (Ex.2-4): Production of Silicon Particles

Analogous to example 1, with the difference that the deposition temperature was varied as indicated in table 2.

The properties of the silicon particles obtained in this way are summarized in table 1.

Examples 5-8 Ex.5-8

Electrodes comprising silicon particles from examples 1-4:

29.709 g of polyacrylic acid (Sigma-Aldrich, Mw 450.000 g/mol) dried to constant weight at 85° C. and 751.60 g of deionized water were agitated by means of a shaker (290 l/min) for 2.5 hours until the polyacrylic acid had completely dissolved. Lithium hydroxide monohydrate (Sigma-Aldrich) was added a little at a time to the solution until the pH was 7.0 (measured using pH meter WTW pH 340i and SenTix RJD electrode). The solution was subsequently mixed for a further 4 hours by means of the shaker.

7.00 g of the silicon particles of the respective example 1-4 were then dispersed in 12.50 g of the neutralized polyacrylic acid solution (concentration 4% by weight) and 5.10 g of deionized water by means of a high-speed mixer at a circumferential velocity of 4.5 m/s for 5 minutes and at 12 m/s for 30 minutes while cooling at 20° C. After addition of 2.50 g of graphite (Imerys, KS6L C), stirring was continued at a circumferential velocity of 12 m/s for a further 30 minutes. After degassing, the dispersion was applied by means of a film drawing frame having a gap height of 0.10 mm (Erichsen, model 360) to a copper foil having a thickness of 0.030 mm (Schlenk Metallfolien, SE-Cu58).

The anode coating produced in this way was subsequently dried for 60 minutes at 80° C. and 1 bar atmospheric pressure.

The anode coating which had been dried in this way had an average weight per unit area of 2.90 mg/cm$^2$ and a layer thickness of 32 μm.

FIG. 2: Scanning electron micrograph of the FIB section of the electrode coating with the silicon particles from example 1 (silicon particles identifiable by the light-grey color).

Examples 9-12 Ex.9-12

Testing of the electrodes from examples 5-8:

The electrochemical studies were carried out on a button cell (type CR2032, Hohsen Corp.) in a two-electrode arrangement. The electrodes from examples 5-8 were used as counterelectrode or negative electrode (Dm=15 mm), and a coating based on lithium-nickel-manganese-cobalt oxide 1:1:1 having a content of 94.0% and an average weight per unit area of 14.5 mg/cm$^2$ was used as working electrode or positive electrode (Dm=15 mm). A glass fiber filter paper (Whatman, GD Type D) impregnated with 120 μl of electrolyte served as separator (Dm=16 mm). The electrolyte used consisted of a one molar solution of lithium hexafluorophosphate in a 3:7 (v/v) mixture of fluoroethylene carbonate and ethyl methyl carbonate which had been admixed with 2% by weight of vinylene carbonate. The construction of the cell was carried out in a Glove box (<1 ppm $H_2O$, $O_2$), and the water content in the dry mass of all components used was below 20 ppm.

The electrochemical testing was carried out at 20° C. The charging of the cell was carried out by the cc/cv method (constant current/constant voltage) with a constant current of 5 mA/g (corresponds to C/25) in the first cycle and of 60 mA/g (corresponds to C/2) in the subsequent cycles and after reaching the voltage limit of 4.2 V at a constant voltage until the current had gone below C/100 or C/8. Discharging of the cell was carried out by the cc method (constant current) using a constant current of 5 mA/g (corresponds to C/25) in the first cycle and of 60 mA/g (corresponds to C/2) in the subsequent cycles until the voltage limit of 3.0 V had been attained. The specific current selected was based on the weight of the coating of the positive electrode.

The results of electrochemical testing are summarized in table 2.

Comparative Example 13 Cex.13

Production of silicon particles by the Siemens process:

A reaction gas consisting of 33 mol % of trichlorosilane in hydrogen was fed into a bell-shaped reactor ("Siemens" reactor) into which thin rods had been introduced as target substrate. At a temperature of 1070° C., silicon was deposited from a trichlorosilane stream of 108 kg/h/m$^2$ of thin rod surface area and 36 standard m$^3$ of $H_2$/h/m$^2$ of thin rod surface area.

The silicon obtained in this way was firstly broken up manually and subsequently precomminuted by means of roller crushers, before subsequently being comminuted in a manner analogous to examples 1-4 by dry milling to a size of d50=4.6 μm.

The properties of the silicon particles obtained in this way are recorded in table 1.

Comparative Example 14 Cex.14

Production of silicon particles by the FBR from monosilane:

In a fluidized-bed reactor, a monosilane mass flow of 22.7 kg/h, a hydrogen flow of 110 standard m$^3$/h, a fluidized bed temperature of 640° C. and a reactor pressure of 2.5 bar were set. The granular silicon obtained in this way was subsequently comminuted by milling in a fluidized-bed jet mill (Netzsch-Condux CGS16, using 90 m$^3$/h of nitrogen at 7 bar as milling gas).

The silicon particles obtained in this way had the following particle size distribution: d10=2.6 μm, d50=4.8 μm and d90=7.9 μm and a breadth (d90-d10) of 5.3 μm.

The properties of the silicon particles obtained in this way are summarized in table 1.

As can be seen from table 1, the silicon particles according to the invention of examples 1-4 have, at 18-85 ppm, a significantly higher proportion of chlorine than the comparative materials of comparative examples 13 and 14, the chlorine content of which is below the detection limit.

TABLE 1

| | Properties of the silicon particles: | | | |
| --- | --- | --- | --- | --- |
| | Deposition temperature [° C.] | Chlorine content [ppm] | BET surface area [m$^2$/g] | Particle size $d_{10}/d_{50}/d_{90}$ [μm] |
| Ex. 1 | 960 | 33 | 2.8 | 2.4/4.5/7.2 |
| Ex. 2 | 980 | 18 | 2.7 | 2.5/4.7/7.7 |

TABLE 1-continued

| | Properties of the silicon particles: | | | |
|---|---|---|---|---|
| | Deposition temperature [° C.] | Chlorine content [ppm] | BET surface area [m²/g] | Particle size $d_{10}/d_{50}/d_{90}$ [μm] |
| Ex. 3 | 965 | 42 | 2.5 | 2.8/4.8/7.6 |
| Ex. 4 | 950 | 85 | 2.9 | 2.3/4.4/7.4 |
| CEx. 13 | 1070 | <5 | 2.5 | 2.4/4.6/7.6 |
| CEx. 14 | 640 | <5 | 2.4 | 2.6/4.8/7.9 |

Comparative Example 15

Electrodes were produced in a manner analogous to example 5 with the difference that the silicon particles of comparative example 13 were used instead of the silicon particles of example 1.

Comparative Example 16

Electrodes were produced in a manner analogous to example 5 with the difference that the silicon particles of comparative example 14 were used instead of the silicon particles of example 1.

Comparative Example 17

The cell construction and the electrochemical testing were carried out in a manner analogous to example 9 with the difference that electrodes from comparative example 15 were used.
The electrochemical data are summarized in table 2.

Comparative Example 18

The cell construction and the electrochemical testing were carried out in a manner analogous to example 9 with the difference that electrodes from comparative example 16 were used.
The electrochemical data are summarized in table 2.

TABLE 2

| Electrochemical testing of (comparative) examples 9-12 and 17-18: | | | |
|---|---|---|---|
| | Coulombic efficiency in formation [%] | Initial discharging capacity during cycling [mAh/cm²] | Cycle with 80% residual capacity |
| Example 9 | 81.5 | 2.09 | 320 |
| Example 10 | 81.3 | 2.16 | 291 |
| Example 11 | 81.3 | 2.17 | 346 |
| Example 12 | 81.2 | 2.18 | 302 |
| Comparative example 17 | 81.7 | 2.10 | 246 |
| Comparative example 18 | 82.1 | 2.09 | 279 |

The testing results in table 2 show that the chlorine-containing silicon particles of examples 1-4 give lithium ion batteries having significantly improved cycling stabilities compared to the chlorine-free silicon particles of comparative examples 13-14.

The invention claimed is:

1. An anode active material for lithium ion batteries, comprising one or more unaggregated silicon particles having a mass-based chlorine content of from 5 to 200 ppm and a volume-weighted particle size distribution having diameter percentiles $d_{50}$ of from 0.5 μm to 10.0 μm.

2. The anode active material for lithium ion batteries as claimed in claim 1, wherein ≥50% by weight of the silicon particles have, based on the total weight of the silicon particles, a mass-based chlorine content of from 5 to 200 ppm.

3. The anode active material for lithium ion batteries as claimed in claim 1, wherein the silicon particles are polycrystalline and have crystalline sizes of from 5 to 200 nm.

4. The anode active material for lithium ion batteries as claimed in claim 1, wherein the silicon particles are obtainable by
   1) pyrolysis of a reaction gas comprising trichlorosilane and/or dichlorosilane in a fluidized-bed reactor at deposition temperatures of from 600° C. to 1000° C. to form granular silicon and subsequent
   2) milling of the granular silicon from step 1) to form the silicon particles.

5. The anode active material for lithium ion batteries as claimed in claim 4, wherein step 1) is carried out in a fluidized-bed reactor.

6. The anode active material for lithium ion batteries as claimed in claim 4, wherein the reaction gas does not contain any monosilane (SiH$_4$).

7. The anode active material for lithium ion batteries as claimed in claim 4, wherein the proportion of dichlorosilane and/or trichlorosilane in the reaction gas is from 50 to 100% by weight, based on the total weight of the silanes.

8. The anode active material for lithium ion batteries as claimed in claim 4, wherein the proportion of monochlorosilane in the reaction gas is from 0 to 50% by weight, based on the total weight of the silanes.

9. The anode active material for lithium ion batteries as claimed in claim 4, wherein the granular silicon is produced by deposition of a reaction gas on seed crystals composed of silicon in a fluidized bed.

10. The anode active material for lithium ion batteries as claimed in claim 4, wherein the pyrolysis is carried out at a temperature of the fluidized bed in the reaction region of from 700° C. to 1000° C.

11. An anode for lithium ion batteries which contains one or more anode active materials as claimed in claim 1.

12. A lithium ion battery comprising a cathode, an anode, a separator and an electrolyte, wherein the anode contains one or more anode active materials as claimed in claim 1.

13. The lithium ion battery as claimed in claim 12, wherein the anode is only partially lithiated in the fully charged lithium ion battery.

14. The lithium ion battery as claimed in claim 13, wherein the ratio of lithium atoms to silicon atoms in the anode material is ≤3.5 in the fully charged state of the lithium ion battery.

* * * * *